United States Patent
Seyller et al.

(10) Patent No.: US 8,744,604 B2
(45) Date of Patent: Jun. 3, 2014

(54) METHOD AND APPARATUS FOR CONFIGURING A BLACKOUT PERIOD FOR SCHEDULED DIAGNOSTIC CHECKS OF A FIELD DEVICE IN A PROCESS PLANT

(75) Inventors: Jeffrey Dean Seyller, Colo, IA (US); Stanley Felix Amirthasamy, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 13/467,651

(22) Filed: May 9, 2012

(65) Prior Publication Data
US 2013/0304238 A1 Nov. 14, 2013

(51) Int. Cl.
*G05B 15/02* (2006.01)

(52) U.S. Cl.
USPC .................... 700/79; 700/26; 700/80

(58) Field of Classification Search
USPC .......... 700/11, 21, 23, 26, 79, 80; 702/81, 84, 702/182, 183, 184
See application file for complete search history.

(56) References Cited

U.S. PATENT DOCUMENTS

| | | | | |
|---|---|---|---|---|
| 5,970,430 A * | 10/1999 | Burns et al. | 702/122 |
| 6,026,352 A * | 2/2000 | Burns et al. | 702/182 |
| 6,298,454 B1 * | 10/2001 | Schleiss et al. | 714/37 |
| 6,615,090 B1 * | 9/2003 | Blevins et al. | 700/26 |
| 6,898,542 B2 * | 5/2005 | Ott et al. | 702/108 |
| 7,079,021 B2 * | 7/2006 | Snowbarger et al. | 340/514 |
| 7,451,644 B2 * | 11/2008 | Karte | 73/168 |
| 7,472,024 B2 * | 12/2008 | Sato | 700/79 |
| 7,828,008 B1 * | 11/2010 | Beckman et al. | 137/487.5 |
| 8,056,390 B2 * | 11/2011 | Filkovski et al. | 73/1.72 |
| 2005/0189017 A1 * | 9/2005 | Eryurek | 137/487.5 |
| 2005/0274417 A1 * | 12/2005 | Perry et al. | 137/487.5 |
| 2008/0211660 A1 * | 9/2008 | Takeuchi | 340/514 |
| 2010/0114386 A1 * | 5/2010 | Fima | 700/276 |
| 2010/0169816 A1 * | 7/2010 | Hammer et al. | 715/771 |
| 2011/0144777 A1 * | 6/2011 | Firkins et al. | 700/80 |
| 2011/0284106 A1 * | 11/2011 | Welker et al. | 137/551 |
| 2012/0042721 A1 * | 2/2012 | Al-Buaijan | 73/168 |
| 2012/0066161 A1 * | 3/2012 | Miller | 706/12 |
| 2012/0290104 A1 * | 11/2012 | Holt et al. | 700/29 |

* cited by examiner

*Primary Examiner* — Charles Kasenge
(74) *Attorney, Agent, or Firm* — Marshall, Gerstein & Borun LLP

(57) ABSTRACT

A diagnostic system and method for a field device in a process plant is provided. The diagnostic apparatus includes a processor operatively connected to the field device and a calendar having a proscribed period stored in memory. A diagnostic check is executed on the field device if an occurrence of a diagnostic event is detected and execution of the diagnostic check does not coincide with the proscribed period.

17 Claims, 3 Drawing Sheets

METHOD AND APPARATUS FOR CONFIGURING A BLACKOUT PERIOD FOR SCHEDULED DIAGNOSTIC CHECKS OF A FIELD DEVICE IN A PROCESS PLANT

FIELD OF THE DISCLOSURE

This disclosure relates generally to diagnostic checks of field devices in a process plant and, more particularly, to a method and apparatus for prohibiting the execution of automatically scheduled diagnostic checks on field devices during proscribed periods.

BACKGROUND

Process control systems and safety instrumented systems (SIS) typically include one or more controllers communicatively coupled to one or more field devices via a communication bus. The controllers of each of these systems use the field devices to perform a variety of control functions within the control environment. For example, the field devices may be used to open or close valves, increase or decrease fluid flow, and measure process parameters, such as temperature, pressure, or fluid flow rate.

Maintaining the process control system and the SIS of a process plant is an ongoing process that includes monitoring the operation of the field devices, periodically testing the field devices, and repairing or replacing the field devices as needed. To maintain the performance of the field device, plant personnel may periodically perform a diagnostic check on the field device. The diagnostic check may also be scheduled or automatically executed by the process control system, SIS, or field device in response to an occurrence of predetermined diagnostic event that is used as a triggering event. The predetermined diagnostic event is typically associated with the field device and may correspond to the field device reaching a pre-determined time limit of operating use, or the failure of a component of the field device to attain a specified position, for example.

One particular field device used in an SIS to maintain the safe operation of a process control system is an emergency shutdown (ESD) valve. In one example implementation, the ESD valve is an actuated valve designed to stop the flow of a fluid upon the detection of a dangerous event. Because the ESD valve is normally in an open position, there is a concern that a buildup of foreign substances may cause the ESD valve to stick or otherwise inhibit the valve's drive mechanism, preventing the ESD valve from functioning properly in an emergency situation. However, fully cycling the ESD valve to check its operability is generally not feasible because fully closing the valve will essentially shut down the process control system.

A partial stroke test (PST) is a standard automated diagnostic check commonly used by plant personnel to test a percentage of the possible failure modes of the ESD valve without having to fully close the valve. To perform the PST, an actuator is activated to partially close the ESD valve, typically by moving the valve approximately 30% of a full stroke. Thereafter, the ESD valve is returned to its fully open state. By moving the ESD valve as far as the process would safely permit, the PST can diagnose operational concerns of the ESD valve without interrupting the control process. Regular use of the PST generally provides for longer intervals between full stroke tests (which does requires a plant to be shut down), thereby reducing plant downtime. The PST is therefore considered to be a sufficient test to exercise the ESD valve during its use, thereby ensuring proper operation of the ESD valve.

There are, however, some valid concerns with using the automated PST. One significant concern is the time at which the PST is eventually executed, most notably in regard to automatically "scheduled" events, such as in response to an occurrence of a diagnostic event. The diagnostic event may correspond to a time or an event. For example, the diagnostic event can relate to a particular time, such as every Monday at 3 pm, or the diagnostic event can relate to a particular event, such as reaching a pre-established limit of operating hours or reaching a pre-established amount of time since the last PST of the ESD valve was performed. Therefore, because the time when a diagnostic event occurs may not always be known, the time when a PST executes in response to the occurrence of a diagnostic event may also not be known. This uncertainty may present a problem to plant personnel if the PST executes during a time when plant personnel are not able to sufficiently support the PST or are not able to respond to an adverse PST result. For instance, if a problem arises during a PST automatically run on an off-shift or holiday, fewer plant personnel may be available to respond if needed, which can have a severe negative impact to plant productivity and personnel safety.

There may also be times when the occurrence of a diagnostic event may not be relevant and a responsive action may therefore be unnecessary. For example, the detection of a valve's position being outside a desired range may usually be reported to plant personnel in accordance with defined protocols. However, should such a variance occur during a plant start-up when the control system is incompletely configured, automatically reporting the variation in this instance may be distracting to plant personnel. It is during plant start-up, for example, that "disabling" the reporting of an occurrence of a diagnostic event trigger would perhaps be desirable and beneficial to plant personnel.

While there are benefits to automatically executing a diagnostic check in response to detecting the occurrence of a diagnostic event, it is possible for the automated diagnostic check to adversely affect the operation of the control system. Because automated diagnostic checks can occur at indeterminate times and perhaps without much advance notice, which may unfavorably affect plant personnel's perceived sense of control with respect to managing the control system, plant personnel may therefore prefer not to use automated diagnostic checks and tests in some instances.

SUMMARY

Example apparatus and methods to improve control of plant operations are herein described. In one example method implemented on a computer device, the method provides a memory device including at least one proscribed period, monitors the field device, and detects an occurrence of a diagnostic event associated with the field device. The method formulates a diagnostic check of the field device in response to the occurrence of the diagnostic event and determines whether execution of the diagnostic check will occur during the at least one proscribed period. The method includes executing a first command if the diagnostic check will not occur during the at least one proscribed period, and executing a second command if the diagnostic check will occur during the at least one proscribed period.

If desired, the commands executed by the example method may include: executing a diagnostic check of the field device, rescheduling execution of the diagnostic check, and/or bypassing the execution of a diagnostic check. The method may further include transmitting an alert associated with the first command to a workstation and/or receiving a calendar including the at least one proscribed period into the memory device.

In a further example embodiment directed to a diagnostic apparatus for a control system having a controller operatively connected to a field device, the diagnostic apparatus includes a processor operatively connected to the field device to detect an occurrence of a diagnostic event. The apparatus includes a memory operatively connected to the processor and a calendar stored in the memory. The calendar includes a proscribed period when execution of a diagnostic check is prohibited. The apparatus includes a diagnostic module stored in the memory, wherein the processor executes the diagnostic module if the occurrence of the diagnostic event is detected and execution of the diagnostic module does not coincide with the proscribed period.

In another example embodiment, a tangible non-transitory computer-readable medium includes instructions stored there on that, when executed by one or more processors, cause the one or more processors to monitor an occurrence of a diagnostic event associated with a field device, detect the occurrence of the diagnostic event, formulate an action responsive to the occurrence of the diagnostic event, determine whether execution of the action will occur during a proscribed period, and execute a command in response to determining whether execution of the action will occur during the proscribed period.

DETAILED DESCRIPTION

Figure 1:
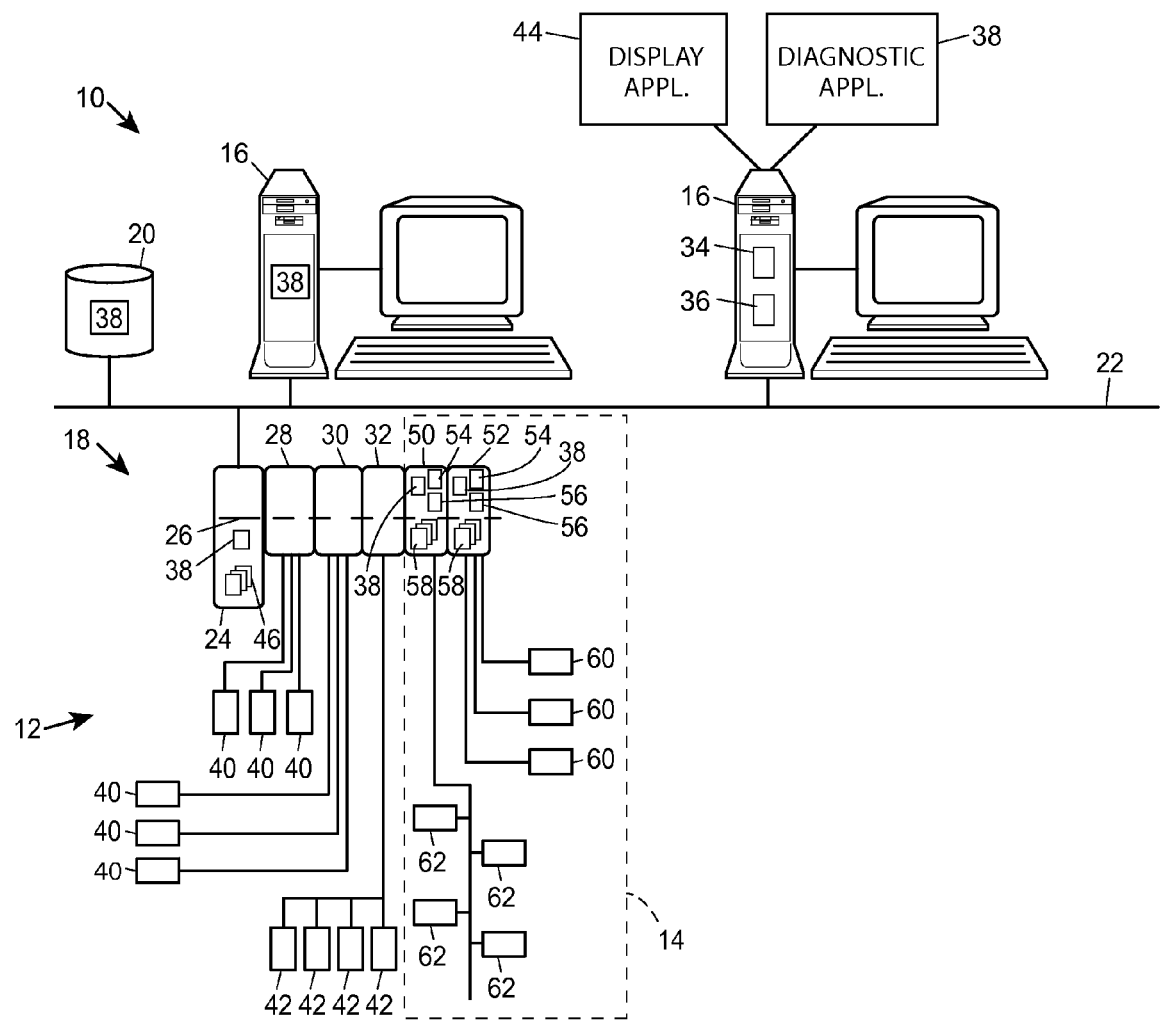
FIG. 1 is a block diagram of an exemplary process plant having a process control system and a safety system.

Referring now to FIG. 1, a process plant 10 includes a process control system 12 integrated with a safety system 14 (depicted within dotted lines) that generally operates as a safety instrumented system (SIS). The safety system 14 monitors the operation of the process control system 12 to ensure the safe operation of the process plant 10. If necessary, the safety system 14 may override control of the process control system 12.

The process plant 10 also includes one or more host workstations 16 or computing devices having a user interface (which may be any type of personal computer, workstation, etc.) that are accessible by plant personnel. In the example illustrated in FIG. 1, two workstations 16 are shown as being connected to a process control/safety control node 18 and to a memory device 20 via a common communication line or bus 22. The communication bus 22 may be implemented using any desired bus-based or non-bus-based hardware, using any desired hardwired or wireless communication structure, and using any desired or suitable communication protocol, such as an Ethernet protocol.

In general, the process plant 10 includes both process control system devices and safety system devices operatively connected together via the bus structure that may be provided on a backplane 26 into which different process controllers and input/output devices are attached. The process plant 10 illustrated in FIG. 1 includes at least one process controller 24 as well as one or more process control system input/output (I/O) devices 28, 30, 32. Each of the process control system I/O devices 28, 30, 32 is communicatively connected to a set of process control related field devices, illustrated in FIG. 1 as field devices 40, 42. The process controller 24, the I/O devices 28, 30, 32, and the controller field devices 40, 42 generally make up the process control system 12 of FIG. 1.

The process controller 24, which may be, by way of example only, a DeltaV™ controller sold by Emerson Process Management or any other desired type of process controller, is programmed to provide process control functionality using the I/O devices 28, 30, 32 and the field devices 40, 42. In particular, the controller 24 implements or oversees one or more process control modules 46 or routines stored in memory therein or otherwise associated therewith and communicates with the field devices 40 and 42 and the workstations 16 to control the process plant 10 or a portion of the process plant 10 in any desired manner.

The control routines 46, which may be control modules or any part of a control procedure such as a subroutine, parts of a subroutine (such as lines of code), etc., may be implemented in any desired software format, such as using ladder logic, sequential function charts, control routine diagrams, object oriented programming or any other software programming language or design paradigm. Likewise, the control routines described herein may be hard-coded into, for example, one or more EPROMs, EEPROMs, application specific integrated circuits (ASICs), PLCs, or any other hardware or firmware elements. The control routines may be designed using any design tools, including graphical design tools or any other type of software/hardware/firmware programming or design tools.

The controller 24 may be configured to implement a control routine or a control strategy in any desired manner. For example, the controller 24 may implement a control strategy using what are commonly referred to as function blocks, wherein each function block is a part or object of an overall control routine and operates in conjunction with other function blocks (via communications called links) to implement process control loops within the process control system 12. Function blocks typically perform one of: an input function such as that associated with a transmitter, a sensor, or other process parameter measurement device; a control function such as that associated with a control routine that performs PID, fuzzy logic, etc. control; or, an output function that controls the operation of some device such as a valve to perform some physical function within the process control system 12. Hybrids of these function blocks, as well as other types of function blocks, may also exist. While the description of the control system is provided herein using a function block control strategy that incorporates an object oriented programming paradigm, the control strategy or control routines or control loops or control modules could also be implemented or designed using other conventions, such as ladder logic, sequential function charts, etc., or using any other desired programming language or paradigm.

The function blocks and control routines may be stored in and executed on by the controller 24, which is typically the case when these function blocks are used for, or are associated with, standard 4-20 ma devices and some types of smart field devices such as HART devices. The function blocks and control routines may also be stored in and implemented by the field devices themselves, which may be the case with Fieldbus devices.

For the purposes of this disclosure, the terms control strategy, control routine, control module, control function block, safety module, safety logic module, and control loop essentially denote a control program executed to control the process and these terms may be interchangeably used herein. However, for the purposes of the following discussion, the term module will be used. It should further be noted that module described herein may have parts thereof implemented or executed on by different controllers or other devices if so desired. In addition, the modules described herein to be implemented within the process control system 12 and the safety system 14 may take any form, including software, firmware, hardware, and any combination thereof.

The field devices 40, 42 may be any desired type, such as sensors, valves, transmitters, positioners, etc., and may conform to any desired open, proprietary, or other communication or programming protocol including, for example, the HART or the 4-20 ma protocol (as illustrated for the field devices 40), any bus protocol such as the Foundation® Fieldbus protocol (as illustrated for the field devices 42), or the CAN, Profibus, and AS-Interface protocols, to name but a few. Similarly, each of the I/O devices 28, 30, 32 may be any known type of process control I/O device using any appropriate communication protocol.

The process plant 10 also includes one or more safety system logic solvers 50, 52. Each of the logic solvers 50, 52 is a safety controller (also invariably referred to as an I/O device) having a processor 54 that executes safety logic modules 58 stored in memory and is communicatively connected to provide control signals to and/or receive signals from safety system field devices 60, 62. The safety controllers 50, 52 and the safety system field devices 60, 62 generally make up the safety system 14 of FIG. 1.

The safety field devices 60, 62 may be any desired type of field device conforming to or using any known or desired communication protocol, such as those mentioned above. In particular, the field devices 60, 62 may be safety-related field devices of the type that are conventionally controlled by a separate, dedicated safety-related control system, such as an emergency shutdown (ESD) valve. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol. Generally, the safety devices (both the controllers 50, 52 and the safety system field devices 60, 62) used as part of the safety system 14 will be rated as safety devices, which typically means that these devices must go through a rating procedure to be rated by an appropriate body as a safety device.

The common backplane 26 (indicated by a dashed line through the process controller 24, the I/O devices 28, 30, 32, and the safety controllers 50, 52) is used to connect the process controller 24 to the process control I/O cards 28, 30, 32, as well as to the safety controllers 50, 52. The process controller 24 is also communicatively coupled to the bus 22 and operates as a bus arbitrator to enable each of the I/O devices 28, 30, 32 and the safety controllers 50, 52 to communicate with any of the workstations 16 via the bus 22. The backplane 26 enables the safety controllers 50, 52 to communicate with one another and coordinate safety functions implemented by each of these devices, to communicate data to one another, or to perform other integrated functions.

Each of the workstations 16 includes a workstation processor 34 and a memory 36 that may store applications or modules adapted to be executed by any of the processors 24, 34, 50, 52 within the process plant 10.

A display application 44 is illustrated in an exploded view in FIG. 1 as being stored in the memory 36 of one of the workstations 16. However, if desired, the display application 44 may be stored and executed in a different workstation 16 or in another computing device associated with the process plant 10. The display application 44 may be any type of interface that, for example, enables a user to manipulate data values (for example, perform reads or writes) to thereby alter operation of the control 46 or safety modules 58 within either or both of the control system 12 and the safety system 14. Thus, if a write is specified to be made to the control module 46 associated with the control system 12 or to one of the field devices 42, for example, the display application 44 enables that write to take place. On the other hand, if the write is specified to be made to the safety logic module 58 associated with the safety system 14 or to one of the field devices 62, for example, the display application 44 enables that write to occur.

A diagnostic application 38 may include one or more diagnostic modules. The diagnostic modules may also be stored in the memory of the workstation 16 for later use by plant personnel in the control 12 or safety 14 systems. Generally speaking, when executed by the respective processors 24, 50, 52 in the control 12 or safety 14 systems, the diagnostic application 38 is capable of checking or testing the operating state of the field devices 40, 42, 60, 62 being used therein. For example, a control loop tuner (which may, for example, be used on either the process control system control loop 12 or the safety system control loop 14) may be one particular module within the diagnostic application 38, control module 46, or safety logic module 58 capable of being executed by the processors 24, 50, 52. A user may select to run this particular module when diagnostic data about the control loop indicates that a control loop is poorly tuned or not operating within desired tolerances.

In addition, other modules of the diagnostic application 38 may be scheduled to run upon a specified condition, for example at a particular time or upon an occurrence of a particular event. For example, a diagnostic module 38 executed by the process controller 24 of the control system 12 may periodically monitor an occurrence of a predetermined diagnostic event, for example, the position of a valve being outside a range. In response to detecting the occurrence of the diagnostic event, the process controller 24 and/or field device may automatically capture data and report the occurrence to plant personnel and/or adjust the valve accordingly, if needed. Similarly, a diagnostic module 38 executed by the safety controller 50, 52 of the safety system 14 may monitor the occurrence of another predetermined diagnostic event, for example, the number of hours an emergency shutdown (ESD) valve has operated, and automatically initiate a partial stroke test (PST) exercising the mechanical components of the ESD valve in response to detecting the occurrence of the diagnostic event.

The results of an executed diagnostic module may be reported and/or displayed to plant personnel at the workstation 16 via the display application 44 and/or at the field devices 40, 42, 60 or 62. For example, an alert may be generated in the field device 40, 42, 60, 62 and sent to the display application 44 for display at the workstation 16. If desired, plant personnel may respond by acknowledging or disabling the control and/or safety alarms displayed at the workstation 16.

Figure 2:
FIG. 2 is an illustration of an example calendar having proscribed periods for executing a response action.

Because a diagnostic check may automatically be run in response to the detection of a diagnostic event, the automated diagnostic check may occur at an unknown and/or inconvenient time. Plant personnel may therefore wish to ensure that when a diagnostic check is automatically run, it is run at a convenient time when sufficient support from plant personnel is available. One manner to ensure that a diagnostic check is run during a convenient time is to utilize a calendar 48 having designated times prohibiting when a diagnostic check will be automatically performed in response to detecting the occurrence of a predetermined diagnostic event. FIG. 2 depicts one example of the calendar 48 including one or more proscribed periods when a diagnostic check is prohibited from being performed. The proscribed or "blackout" periods may be displayed over hours, days, weeks, or years. In addition, the proscribed periods may be shown in a list view, or in any other view, and need not be confined to the example depicted in FIG. 2.

The calendar 48 can be input into any of the memory locations within the process plant 10 through any known manner, including, and not limited to, inputting, downloading, or uploading from a wired or wireless handheld device, workstation 16, remote device, remote controller, etc. The calendar 48 may be edited by plant personnel and exclusively associated with a single field device 40, 42, 60, 62 or generally associated with multiple field devices. In cases were one calendar is associated with one particular field device, another calendar may be associated with another field device. Additional calendars may also be associated with a particular type of field device or a particular type of diagnostic check and stored in memory throughout the process plant 10.

Periods for prohibiting the execution of a diagnostic check can be designated in the calendar 48 by plant personnel on a discrete or periodic (repetitive) basis, such as holidays, weekends, every other Friday, off-shifts, plant shutdowns, etc. This additional functionality provided in part by the calendar 48 offers plant personnel added flexibility in managing the control system, particularly in regard to executing automated scheduled diagnostic checks. All formulations, comparisons, and determinations involving the diagnostic event, the calendar 48, and the response action and its execution may be resolved through the cooperation of the process controller 12, safety controller 50, 52, and workstation controller 54 along with the process plant's 10 memory locations.

Figure 3:
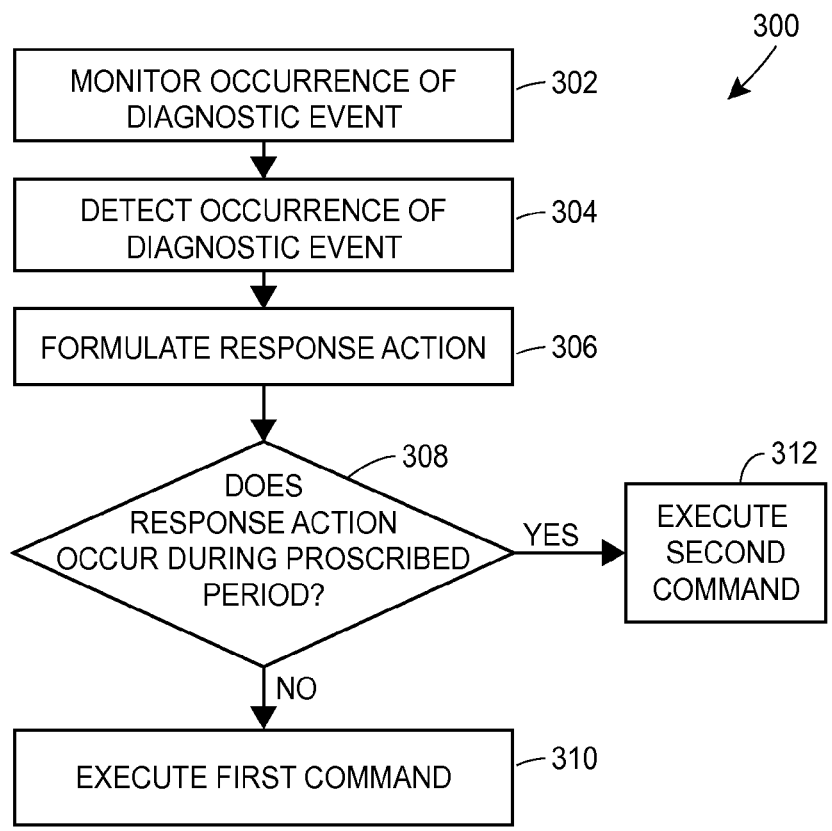
FIG. 3 illustrates an example module or process flow diagram to provide further control to the control system shown in FIG. 1.

FIG. 3 depicts a flowchart 300 of an example method of one embodiment of the invention where an occurrence of a diagnostic event associated with a field device is monitored (block 302). The diagnostic event may be a recognition of a component of the field device being positioned outside of a desired range, for example, a valve. In response to the detection of the occurrence of the diagnostic event associated with the field device (block 304), a response action is formulated (block 306). A calculation by the processor is made to determine whether execution of the response action will occur during a proscribed period (block 308) that may have been previously designated by plant personnel in the calendar 48. That is, the execution time of the response action is compared against the proscribed period(s) of the calendar 48 to determine whether the response action would occur during a prohibited period. If the execution of the response action will not occur during the proscribed period, a first command is executed (block 310). Some example first commands that may be executed include conducting a diagnostic check, transmitting an alert or a report to the workstation, and adjusting the field device. However, if the execution of the response action will occur during the proscribed period, a second command is executed (block 312). Some example second commands include rescheduling the response action to be executed at a time that does not coincide with the prohibited period or ignoring and not reporting the diagnostic event. For example, plant personnel may designate that specific diagnostic checks, such as a valve position check of a particular field device valve, be ignored during a plant start-up or a prescribed maintenance period. Thus, any associated diagnostic events occurring during this designated period may be ignored.

In addition to postponing or delaying a responsive action to the occurrence of a diagnostic event, or ignoring the occurrence of the diagnostic event altogether, it may be preferable at times to initiate an action in response to the occurrence of the diagnostic event to take place earlier than expected. Foreseeing that a diagnostic event is likely to occur during a future proscribed period and rescheduling the responsive action or diagnostic check before such time, will avoid potential ramifications associated with delaying the responsive action beyond an instituted time period.

Figure 4:
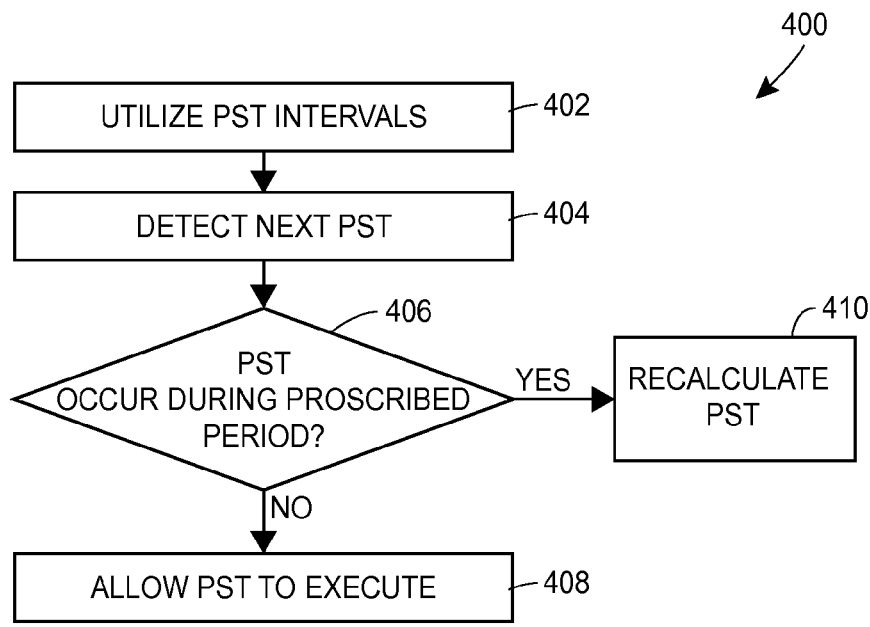
FIG. 4 illustrates an example module or process flow diagram to provide further control to the control system shown FIG. 1.

FIG. 4 depicts a flowchart 400 describing another example method for implementing the disclosed technique in a control system where a diagnostic event associated with a field device is monitored. In particular, a PST interval is utilized to detect an occurrence of the next scheduled PST (block 402). The PST interval is a period typically referred to in hours of operation, and designates the amount of use an associated ESD valve may operate before requiring a PST. In one example, the field device will track the operating usage of the ESD valve and monitor the operating time remaining in the interval until a PST is initiated. The next occurrence of the PST can be detected, or determined, by projecting when the operating hours of the PST interval will expire. The time when the ESD valve's remaining operating hours are expected to expire can be checked against the proscribed period(s) within the calendar (block 406). If the expiration time of the PST interval does not overlap or coincide with any of the proscribed periods designated in the calendar, a command may be issued to execute the PST as scheduled at the expiration time of the PST interval (block 408). If however the expiration time of the PST interval is projected to overlap or coincide with any portion of the proscribed periods in the calendar, an alternate time that does not conflict with the proscribed periods of the calendar for executing the PST may be scheduled for the PST. In regard to the rescheduling of the PST, to avoid circumventing safety measures, it is preferred to reschedule the PST to occur earlier than the expected expiration of the PST interval, as opposed to delaying the PST to execute at a later time beyond the expiration PST interval. For example, the execution of the PST may be brought earlier in time to ensure the PST executes before any prescribed deadlines or limits.

It is apparent from the description above that plant personnel's perceived and actual level of control in managing a control system may be increased by utilizing a calendar having designated periods when execution of an automatic diagnostic check in response to an occurrence of a diagnostic event is prohibited. The collection of proscribed periods reduces the likelihood that an automatically executed diagnostic check will occur when plant personnel are ill-equipped to support the diagnostic check.

Although certain example methods, apparatus and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method of controlling a field device in a control system, the method comprising:
providing a memory device including at least one proscribed period;
monitoring, via a processor, the field device;
detecting, via a processor, an occurrence of a diagnostic event associated with the field device;
formulating, via a processor, a diagnostic check of the field device in response to the occurrence of the diagnostic event;
determining, via a processor, whether execution of the diagnostic check will occur during the at least one proscribed period;
executing, via a processor, the diagnostic check if the diagnostic check will not occur during the at least one proscribed period; and
rescheduling, via a processor, execution of the diagnostic check if the diagnostic check will occur during the at least one proscribed period.

2. The method of claim 1, wherein rescheduling execution of the diagnostic check includes rescheduling execution of the diagnostic check to occur before the at least one proscribed time period.

3. The method of claim 1, wherein executing the diagnostic check includes executing a partial stroke test.

4. The method of claim 1, wherein rescheduling execution of the diagnostic check includes bypassing the diagnostic check.

5. The method of claim 1, further comprising transmitting an alert associated with the diagnostic check to a workstation.

6. The method of claim 1, further comprising receiving a calendar including the at least one proscribed period into the memory device.

7. A diagnostic apparatus for a control system having a controller operatively connected to a field device, the diagnostic apparatus comprising:
a processor operatively connected to the field device to detect an occurrence of a diagnostic event;
a memory operatively connected to the processor;
a calendar stored in the memory, the calendar including a proscribed period when execution of a diagnostic check is prohibited; and,
a diagnostic module stored in the memory, wherein the processor executes the diagnostic module if the occurrence of the diagnostic event is detected and execution of the diagnostic module does not coincide with the proscribed period, and the processor reschedules execution of the diagnostic module if the occurrence of the diagnostic event is detected and execution of the diagnostic module does coincide with the proscribed period.

8. The diagnostic apparatus of claim 7, wherein the diagnostic event is associated with an operating parameter of the field device.

9. The diagnostic apparatus of claim 7, wherein the field device is an emergency shutdown valve.

10. The diagnostic apparatus of claim 7, wherein execution of the diagnostic module carries out a partial stroke test of the field device.

11. The diagnostic apparatus of claim 7, wherein execution of the diagnostic module carries out a data capture in the field device.

12. The diagnostic apparatus of claim 7, wherein execution of the diagnostic module carries out alert generation and broadcast.

13. The diagnostic apparatus of claim 7, wherein execution of the diagnostic module carries out alert broadcast.

14. The diagnostic apparatus of claim 7, wherein the rescheduled execution of the diagnostic module enables the diagnostic module to be executed before the proscribed period.

15. The diagnostic apparatus of claim 7, wherein the rescheduled execution of the diagnostic module enables the diagnostic module to be bypassed.

16. A tangible non-transitory computer-readable medium having instructions stored there on that, when executed by one or more processors, cause the one or more processors to:
monitor an occurrence of a diagnostic event associated with a field device;
detect the occurrence of the diagnostic event;
formulate an action responsive to the occurrence of the diagnostic event;
determine whether execution of the action will occur during a proscribed period;
execute the action if the execution of the action will not occur during the proscribed period; and,
reschedule the action if the execution of the action will occur during the proscribed period.

17. The tangible non-transitory computer-readable medium of claim 16, wherein the rescheduled action occurs before the proscribed period.

* * * * *